United States Patent
Zilbershtein et al.

(10) Patent No.: US 11,323,310 B2
(45) Date of Patent: *May 3, 2022

(54) METHOD, DEVICE, AND SYSTEM FOR PROVIDING HOT RESERVATION FOR IN-LINE DEPLOYED NETWORK FUNCTIONS WITH MULTIPLE NETWORK INTERFACES

(71) Applicant: ALLOT LTD., Hod HaSharon (IL)

(72) Inventors: Itai Ephraim Zilbershtein, Hod HaSharon (IL); Nimrod Dezent, Kfar Saba (IL); Alon Hazay, Ramat HaSharon (IL); Itai Weissman, Kiryat Ono (IL); Boris Lifshitz, Kokhav Yair (IL)

(73) Assignee: ALLOT LTD., Hod Hasharon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/076,854

(22) Filed: Oct. 22, 2020

(65) Prior Publication Data
US 2021/0044476 A1    Feb. 11, 2021

Related U.S. Application Data

(63) Continuation-in-part of application No. 16/449,444, filed on Jun. 24, 2019, now Pat. No. 10,833,981.

(51) Int. Cl.
*H04L 12/24*    (2006.01)
*H04L 12/947*   (2013.01)
(Continued)

(52) U.S. Cl.
CPC ...... *H04L 41/0668* (2013.01); *H04L 41/0806* (2013.01); *H04L 43/0829* (2013.01);
(Continued)

(58) Field of Classification Search
CPC ............ H04L 41/0668; H04L 41/0806; H04L 43/0829; H04L 47/24; H04L 49/25;
(Continued)

(56) References Cited

U.S. PATENT DOCUMENTS 9,100,274 B1    8/2015 Ghosh
10,089,123 B2   10/2018 Bernstein
(Continued)

FOREIGN PATENT DOCUMENTS

WO    2004/021652 A2    3/2004

*Primary Examiner* — Mohamed A Kamara
(74) *Attorney, Agent, or Firm* — Eitan Mehulal Sadot

(57) ABSTRACT

Method, device, and system for providing hot reservation for in-line deployed network functions with multiple network interfaces. A system includes a first Network Function (NF) unit, connected to an ingress router and to an egress router; and a second NF unit, connected to the ingress router and to the egress router. The first NF unit is initially configured as a controlling NF. The second NF unit is initially configured as a backup NF. The two NF units periodically exchange keep-alive messages via the two routers. The second NF unit, operating as the backup NF, automatically triggers a switchover if the second NF unit did not receive a keep-alive message from the first NF unit for at least a pre-defined time-period. Additionally or alternatively, the controlling NF initiates a switchover if the maintenance status parameters of the backup NF are better than those of the controlling NF.

20 Claims, 5 Drawing Sheets

(51) Int. Cl.
*H04L 41/0668* (2022.01)
*H04L 41/0806* (2022.01)
*H04L 61/10* (2022.01)
*H04L 61/5007* (2022.01)
*H04L 47/24* (2022.01)
*H04L 49/25* (2022.01)
*H04L 43/0829* (2022.01)

(52) U.S. Cl.
CPC .............. *H04L 47/24* (2013.01); *H04L 49/25* (2013.01); *H04L 61/10* (2013.01); *H04L 61/2007* (2013.01)

(58) Field of Classification Search
CPC ............... H04L 43/028; H04L 43/0823; H04L 43/0852; H04L 43/0888; H04L 43/0805; H04L 43/10; H04L 45/28; H04L 45/22
See application file for complete search history.

(56) References Cited

U.S. PATENT DOCUMENTS

| | | | |
|---|---|---|---|
| 10,833,981 B1 * | 11/2020 | Zilbershtein | H04W 12/06 |
| 10,972,409 B1 * | 4/2021 | Melkild | H04L 49/557 |
| 2014/0143591 A1 | 5/2014 | Chiang | |
| 2014/0211792 A1 | 7/2014 | Li | |
| 2017/0331884 A1 * | 11/2017 | Colle | H04L 12/4641 |
| 2018/0123870 A1 * | 5/2018 | Xue | H04L 41/0663 |
| 2018/0183750 A1 | 6/2018 | Wang | |
| 2021/0044476 A1 * | 2/2021 | Zilbershtein | H04L 47/24 |

\* cited by examiner

METHOD, DEVICE, AND SYSTEM FOR PROVIDING HOT RESERVATION FOR IN-LINE DEPLOYED NETWORK FUNCTIONS WITH MULTIPLE NETWORK INTERFACES

CROSS-REFERENCE TO RELATED APPLICATIONS

This patent application is a Continuation-in-Part (CIP) of U.S. Ser. No. 16/449,444, filed on Jun. 24, 2019, which is hereby incorporated by reference in its entirety.

FIELD

The present invention relates to the field of telecommunication systems.

BACKGROUND

Electronic devices and computing devices are utilized on a daily basis by millions of users worldwide. For example, laptop computers, desktop computers, smartphone, tablets, and other electronic devices are utilized for browsing the Internet, consuming digital content, streaming audio and video, sending and receiving electronic mail (email) messages, Instant Messaging (IM), video conferences, playing games, or the like.

SUMMARY

Some embodiments of the present invention comprise methods, devices, and systems for providing hot reservation for in-line deployed network functions with multiple network interfaces. For example, a system includes a first Network Function (NF) unit, connected to an ingress router and to an egress router; and a second NF unit, connected to the ingress router and to the egress router. The first NF unit is initially configured as a controlling NF. The second NF unit is initially configured as a backup NF. The two NF units periodically exchange keep-alive messages via the two routers. The second NF unit, operating as the backup NF, automatically triggers a switchover if the second NF unit did not receive a keep-alive message from the first NF unit for at least a pre-defined time-period. Additionally or alternatively, the controlling NF initiates a switchover if the maintenance status parameters of the backup NF are better than those of the controlling NF The present invention may provide other and/or additional advantages and/or benefits.

DETAILED DESCRIPTION OF SOME DEMONSTRATIVE EMBODIMENTS

Figure 1:
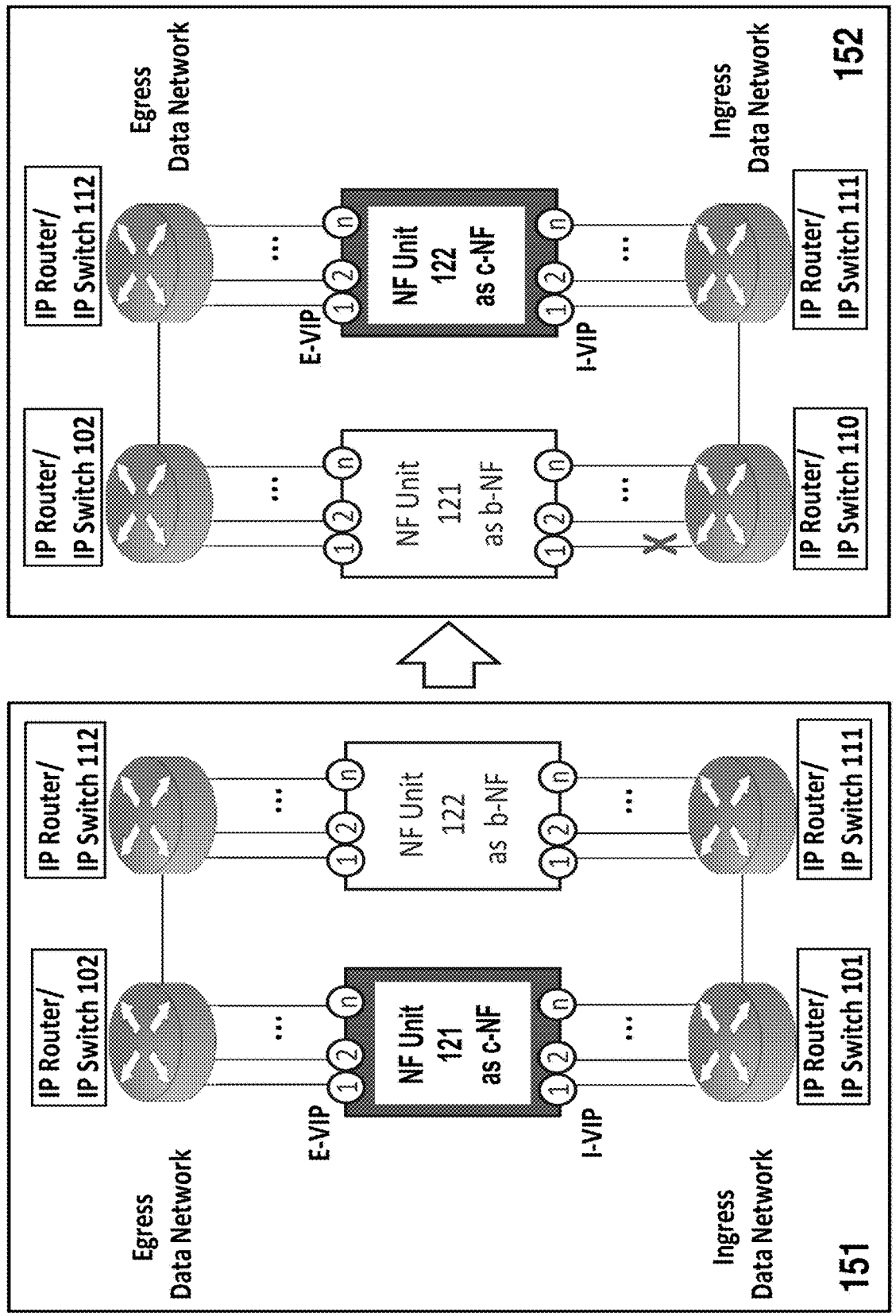
FIG. 1 is a schematic illustration demonstrating an automated transition from a pre-failure configuration to a post-failure configuration, in accordance with some demonstrative embodiments of the present invention.

The Applicants have realized that most in-line deployed Network Function (NF) units or modules or components, need to support High Availability Configuration (HAC) and/or need to have redundancy, in order to avoid negative business impact or implications due to a temporary or permanent hardware or software failure or malfunction. Such NF units may be or may comprise, for example, a Physical NF (PNF) unit, a Virtual NF (VNF) unit, and/or a Containerized NF (CNF) unit. Such NF unit(s) may be implemented as a virtual module or unit or component, as a Virtual Machine (VM) or as a component within a VM, as a container or as part of a container, as a Docker implementation or container, as a Kubernetes implementation or container, as a simulated or emulated component, as an entirely-software component that is executed by a processor or computer or network node or network element, as an entirely-hardware component, as a hybrid hardware-and-software device, and/or by using other suitable implementations.

The Applicants have realized that such NF units may be divided or classified into two groups: (i) a Stateful NF, which provides stateful traffic processing; (ii) a Stateless NF, which provides stateless traffic processing. The Applicants have realized that NF units belonging to each group, have different operational requirements. For example, a Stateful NF needs to have synchronization of state-related data, between a Controlling NF (c-NF) and a backup NF (b-NF); and lack of real-time synchronization or lack of data integrity in such case may lead to connection loss, loss of state data, failure to maintain state, incorrect traffic management decision, incorrect reports, and/or other problems.

The Applicants have also realized that reducing or minimizing switchover time may increase the reliability and resilience of a Stateful NF. The switchover time may include the time-period required for detection of the fault or malfunction, as well as the time-period required for the b-NF to take over the activity instead of the c-NF. The Applicants have realized that a high or relatively high value of such switchover time, which may sometimes depend also on the particular service provider and its network, may adversely impact or may negatively affect the active services, may increase packet loss ratio, may increase network latency, and/or may have other adverse effects on network performance.

The Applicants have realized that a partial mitigation of the problem with regard to Internet Protocol (IP) routers, may be achieved by using "Virtual Router Redundancy Protocol (VRRP) Version 3 for IPv4 and IPv6", published in March 2010 by the Internet Engineering Task Force (IETF) as Request for Comments (RFC) 5798. However, the Applicants have realized that this protocol, which has limitations of its own, is not applicable for a Stateful NF units.

The present invention provides methods and systems that address the need for providing full reservation and/or hot reservation and/or rapid switchover, for in-line deployed multi-interface NF units or module, thereby secure or increasing the availability and reliability of services. In some embodiments, each ingress interface of a particular NF unit, also has a tightly-coupled egress interface; and therefore, loss of availability at one side of the interface pair, causes or indicates unavailability of the other side of that interface pair as well. The method and system of the present invention further define mechanisms for data synchronization between a stateful c-NF unit and a (respective) stateful b-NF unit; and may ensure or may guarantee that a switchover will be timely and rapidly initiated once needed, thereby improving the overall operational status of such Stateful NF pair (stateful c-NF and its respective stateful b-NF).

It is clarified that the system and method of the present invention are uniquely tailored to operate in conjunction with Stateful NF units, which may be more difficult to handle with regard to hot availability and redundancy when compared to Stateless NF units; although the present invention may operate with, and may be suitable for, both Stateful NF units and Stateless NF units. For example, a Stateless NF unit does not "store" data and does not save state; whereas a Stateful NF unit stores data, saves state, and requires such storing to be backed up: a Stateful NF unit requires some type of non-volatile/persistent storage that will survive a restart of the NF unit. Keeping or maintaining state is critical to operating or running a Stateful NF unit; whereas, in contrast, any data that flows via a Stateless NF unit is transitory, such that state need not be maintained or stored at all, or, at most, and the state may be stored only in a separate back-end service (e.g., a database). In a Stateless NF unit, any associated storage is ephemeral or temporary; and if, for example, the Virtual Machine (VM) or Container implementation of the Stateless NF unit restarts, then anything stored is lost. A Stateless NF unit may be required to retrieve associated data from an external database for every new packet or transaction; and thus it adds or inserts significant latency into traffic processing, and cannot be utilized in (or applied for) latency-sensitive data-flows, or data-flows that would suffer significantly if they are subject to latency or delays or lags.

The Applicants have realized that VRRP is limited, as it considers only availability of a single Controlling Gateway with a single interface to the Local Network. The Applicants have realized that VRRP cannot handle a system in which the Gateway is connected to an external network, and/or a system in which traffic incoming from the external network is reconfigured using routing protocols (e.g., OSPF or BGP). The Applicants have realized that VRRP cannot be applied to systems having a multi-interface node, such that interfaces on one side are paired with (or aggregated into) interface(s) on the other side. The Applicants have further realized that an attempt to utilize VRRP for hot reservation of Stateful NF units, would cause loss of information about all stable connections and/or sessions.

Some embodiments of the present invention provide a "1+1" or "one plus one" redundancy scheme or hot availability scheme, which may be used with Stateful and/or Stateless NF units. A switch or hot-swap or switch activity may automatically be initiated or triggered and performed, between the c-NF unit and the b-NF unit, if (and only if) a maintenance status of the b-NF and/or the serviceability (e.g., the service level) of its multiple interfaces are better than (greater than) the corresponding features of the c-NF unit. For demonstrative purposes, a "one plus one" redundancy scheme is presented; however, the present invention may similarly operate in conjunction with a "1+2" or "1+1+1" redundancy scheme, or other suitable redundancy or hot-swap schemes; for example, in which a single c-NF unit is associated with two b-NF units, or in which a single c-NF unit is associated with a primary b-NF unit which in turn is associated with a secondary b-NF unit; or in a "2+1" redundancy scheme in which a single b-NF unit is associated with two different c-NF units; or the like.

In order to manage and be able to re-switch bi-directional traffic, the c-NF unit holds or maintains or utilizes two Virtual IP addresses (VIP addresses): a first VIP address for incoming traffic or ingress traffic (I-VIP), and a second VIP address for outgoing traffic or egress traffic (E-VIP). The I-VIP address of the c-NF represents the c-NF unit in the Local Network; whereas the E-VIP address of the c-NF unit represents the c-NF unit in the External Network. During a switchover or a hot-swap, both VIP addresses migrate from the c-NF unit to the b-NF unit; and the b-NF unit changes its operational mode to become the new c-NF, whereas the former c-NF unit changes its operational mode to become the new b-NF unit. Restoration of disabled or failed capabilities or services will lead to a switchover only if such switchover will improve the overall service availability of the pair of c-NF and b-NF units.

Reference is made to FIG. 1, which is a schematic illustration demonstrating an automated transition from a pre-failure configuration 151 to a post-failure configuration 152, in accordance with some demonstrative embodiments of the present invention.

In the pre-failure configuration 151, a first NF unit 121 operates as c-NF; and a second NF unit 122 operates as b-NF. The NF unit 121 which operates as c-NF, is connected via its I-VIP to an IP router/IP switch 101 of an ingress data network. The NF unit 121 which operates as c-NF, is connected via its E-VIP to an IP router/IP switch 102 of an egress data network. As denoted by "1" and "2" and ". . . n", one or more such connections may be utilized in parallel to each other.

Additionally, in the pre-failure configuration 151, The NF unit 122 which operates as b-NF, is connected to an IP router/IP switch 111 of the ingress data network. The NF unit 122 which operates as b-NF, is connected to an IP router/IP switch 112 of the egress data network. As denoted by "1" and "2" and ". . . n", one or more such connections may be utilized in parallel to each other.

In the post-failure configuration 152, an "X" over one of the ingress connections indicates that a failure or malfunction occurred at connection #1 between the IP router/IP switch 101 and the NF unit 121; which used to be (pre-failure) the c-NF unit. Due to this failure, the NF unit 122, which used to be (pre-failure) the b-NF unit, now assumes the role of the c-NF; and the NF unit 121 now assumes the role of the b-NF. Additionally, the current c-NF, which is the NF unit 122, establishes its I-VIP address to which the IP router/IP switch 111 is now connected, and establishes its E-VIP address to which the IP router/IP switch 112 is now connected.

Figure 2:
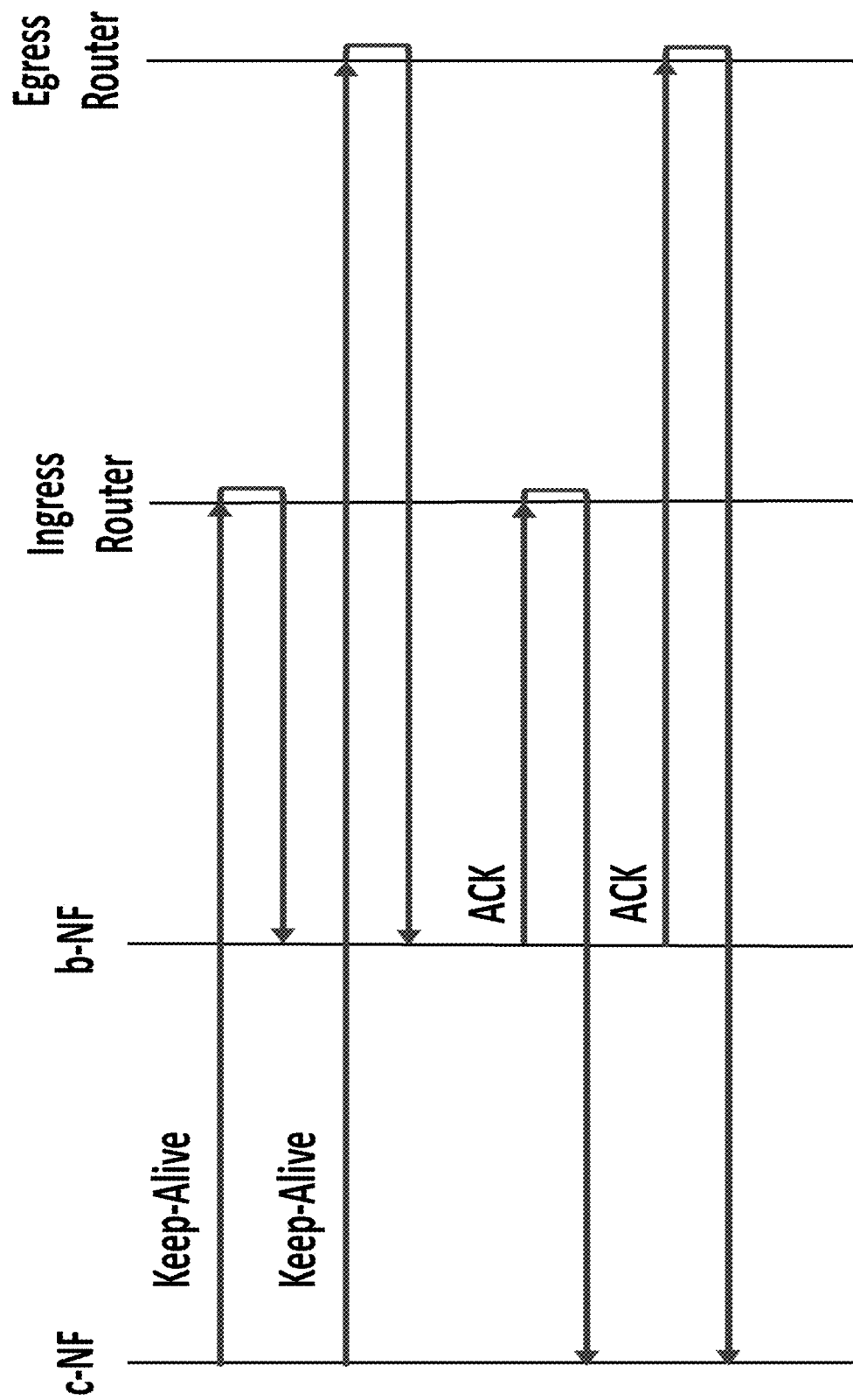
FIG. 2 is a schematic illustration demonstrating a message flow in a pre-failure or "normal" operation, in accordance with some demonstrative embodiments of the present invention.

Reference is made to FIG. 2, which is a schematic illustration demonstrating a message flow 200 in a pre-failure or "normal" operation, in accordance with some demonstrative embodiments of the present invention. In order to synchronize operational data and to update service status, the c-NF unit sends to the b-NF unit periodic "keep alive" messages, via next hops in the Ingress data network and the Egress data network, with state record for each active connection/session. Upon receiving the "keep alive" message, the b-NF unit replies with an acknowledgement ("ACK") message which includes also the maintenance status of its interfaces and next hops accessibility.

Figure 3:
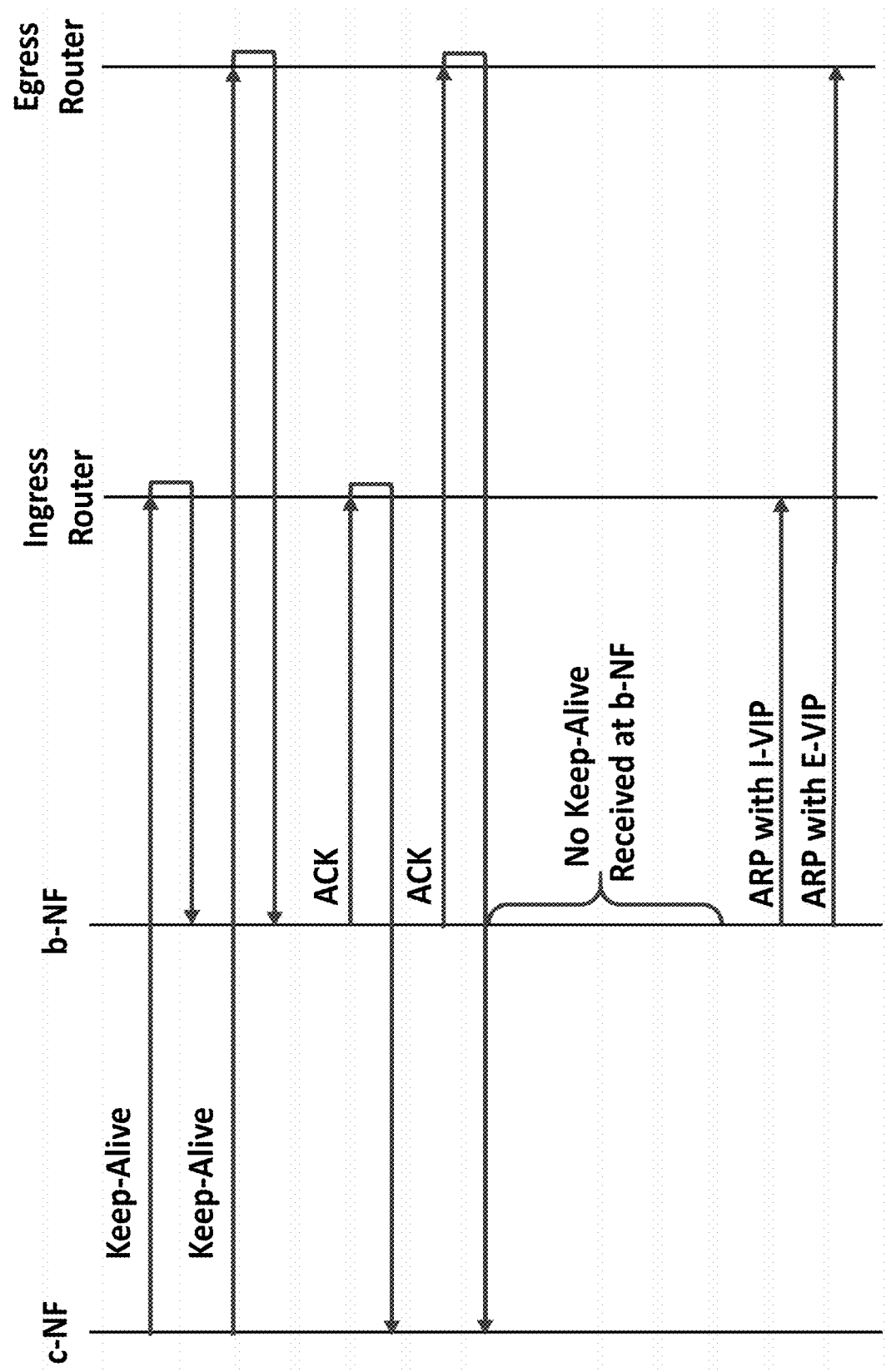
FIG. 3 is a schematic illustration demonstrating a message flow during a failure or an "abnormal" operation, in accordance with some demonstrative embodiments of the present invention.

Reference is made to FIG. 3, which is a schematic illustration demonstrating a message flow 300 during a failure or an "abnormal" operation, in accordance with some demonstrative embodiments of the present invention. The b-NF unit does not receive a "keep alive" message within a pre-defined time-window of T seconds; and therefore, the n-BF unit determines that a failure or malfunction occurred at the c-NF unit, and the b-NF initiates and triggers a switchover such that the original b-NF becomes the new c-NF and vice versa.

Figure 4:
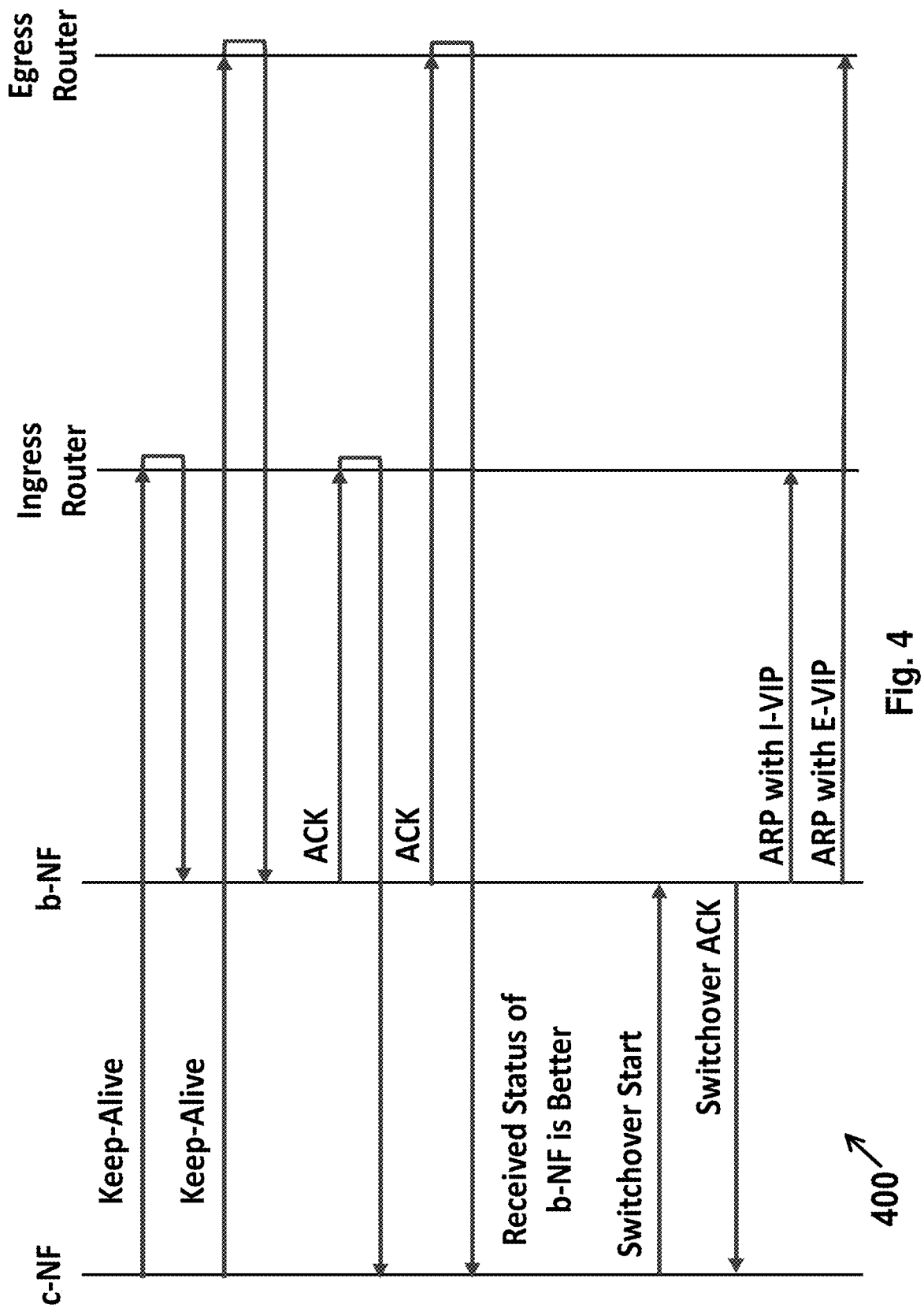
FIG. 4 is a schematic illustration demonstrating a message flow in which a controlling Network Function (c-NF) unit initiates a switchover, in accordance with some demonstrative embodiments of the present invention.

Reference is made to FIG. 4, which is a schematic illustration demonstrating a message flow 400 in which the c-NF unit (and not the b-NF unit) initiates a switchover, in accordance with some demonstrative embodiments of the present invention. For example, the c-NF unit receives from the b-NF unit, the ACK message of the b-NF unit which includes also the maintenance status of the b-NF interfaces and next hops accessibility; and the c-NF unit compares and determines that the maintenance status of the b-NF interfaces is better than the current maintenance status of the c-NF interfaces; thereby triggering the c-NF to start a switchover. This checking or comparison may be based particularly on the availability level and/or serviceability level of the b-NF and its interfaces, compared to (or relative to) those of the c-NF and its interfaces; and/or other key performance indicators or traffic quality parameters such as, for example, Bit Error Ratio (BER), Packet Loss Ratio, (PLR) and Packet Error Ratio (PER), or a suitable combination of these parameter and/or other parameters.

As it was mentioned above, VRRP is the closest in functionality method. It allows reserve routing function (default gateway) by number of backup nodes (1 or more) Alike the proposed method, VRRP uses VIP mechanism and Controlling Gateway broadcasts its status to all Backups in the Local Network. VRRP is focusing on selection of next Controlling Gateway.

It is clarified that the method and system of the present invention may be particularly suitable for a Stateful NF unit, which stores or maintains data that corresponds to, for example: list of all active connections per user; counters (e.g., the number of transmitted bytes); copies of the last N packets and their respective timestamps (e.g., for network protection purposes), or the like. Any new message for an already established connection, can be forwarded to any instance of the same NF unit; and thus, all the operational information that is related to that specific connection, should be available for all instances of the same NF unit; thereby requiring a Stateless NF unit to store such information in a remote repository, and not locally. Furthermore, the Stateful NF unit is a multi-interface NF unit, able to perform two or more functions on a packet in transit or on a batch of packets in transit (e.g., a first function such as anti-malware analysis, and a second function such as Deep Patent Inspection (DPI) analysis); such that the Stateful NF unit has multiple interfaces (not only a single interface) to local network(s) and/or external network(s). Such Stateful NF unit should maintain connection-related data (e.g., raw data, aggregated data) during the connection live-time, and in some situations even longer (e.g., in a direct contrast to the operation of a Router, which may keep only last few packets for re-transmission purposes). Furthermore, the Stateful NF unit(s) in accordance with the present invention are capable of making real-time or near-real-time decisions, based on the stored data; and in some situations, even if the connection is preserved during a switchover from c-NF to b-NF, the system may make some incorrect decisions due lack of data integrity (e.g., unlike a Router, in which loss of a few packets in transit typically does not damage the application which is often able to overcome such loss); and the system of the present invention initiates a switchover from c-NF to b-NF by analyzing availability and/or performance of all the relevant interfaces.

Figure 5:
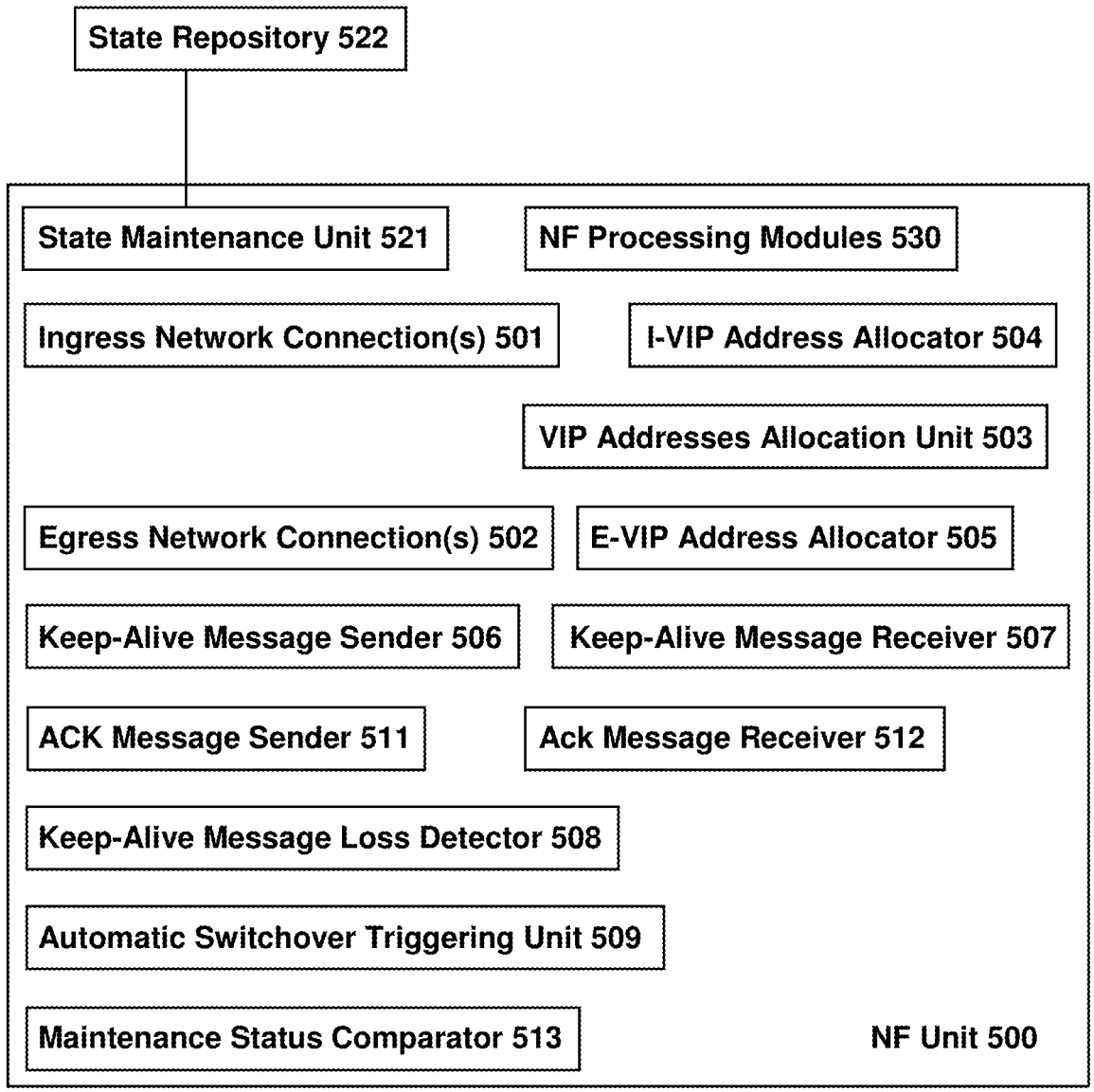
FIG. 5 is a schematic block-diagram illustration of a Network Function (NF) unit, in accordance with some demonstrative embodiments of the present invention.

Reference is made to FIG. 5, which is a schematic block-diagram illustration of a Network Function (NF) unit 500, in accordance with some demonstrative embodiments of the present invention. NF unit 500 may be a multiple-interface Stateful NF unit; and may be implemented as a physical hardware-based device, or as a virtualized unit, or as a cloud-based unit, as a containerized unit, and/or using other suitable type of implementation.

NF unit 500 may comprise a State Maintenance Unit 521, which may be responsible for saving or storing state of live connections in a State Repository 522 (e.g., which may be remote to, or external from, the NF unit 500). One or more suitable parameters, data, meta-data, time-stamps, descriptors, or other state-related information, may be saved or stored; as well as actual copies of packets that are in transit (e.g., for DPI purposes, for cyber protection operations, or the like).

NF unit 500 may utilize one or more Ingress Network Connection(s) 501 to communicate with (e.g., to receive packets from) an ingress data network; and may utilize one or more Egress Network Connection(s) 502 to communicate with (e.g., to send packets to) an egress data network. A Virtual IP (VIP) Addresses Allocation Unit 503 may allocate or define or assign one or more VIP addresses; and may optionally comprise, or may be implemented using, an Ingress VIP (I-VIP) Address Allocator 504 and an Egress VIP (E-VIP) Address Allocator 505.

A Keep-Alive Message Sender 506 may periodically send out a keep-alive message, to the ingress router and/or to the egress router; for example, when the NF unit 500 operates as a c-NF. A Keep-Alive Message Receiver 507 may periodically receive incoming keep-alive messages, from the ingress router and/or from the egress router; for example, when the NF unit 500 operates as a b-NF.

A Keep-Alive Message Loss Detector 508 may check, continuously or periodically or at pre-defined time intervals, whether a keep-alive message was not received from the c-NF, via the ingress router and/or via the egress router, for at least a pre-defined time-period; and if the check result is positive, then, an Automatic Switchover Triggering Unit 509 may operate to trigger an automatic switchover of roles between the current NF unit 500 and a second NF unit. For example, if the NF unit 500 currently operates as the b-NF, then a new I-VIP address may be generated and sent from NF unit 500 to the ingress router (e.g., via an ARP message); and a new E-VIP may be generated and sent from NF unit 500 to the egress router, such that the NF unit 500 switches itself from being the b-NF to being the c-NF.

When the NF unit 500 operates as the b-NF, an ACK Message Sender 511 may periodically send an ACK message to the c-NF via the ingress router; and may periodically send an ACK message to the c-NF via the egress router. When the NF unit 500 operates as the c-NF, an Ack Message Receiver 512 may periodically receive the ACK message from the b-NF via the ingress router; and may periodically receive the ACK message from the b-NF via the egress router.

When the NF unit 500 operates as the c-NF, a Maintenance Status Comparator 513 may periodically check and/or determine, whether the maintenance status of the b-NF interfaces is better than the current maintenance status of its own (i.e., of the NF unit 500 itself which currently operates as the c-NF). If the check result is positive, then the Automatic Switchover Triggering Unit 509 may operate to trigger an automatic switchover of roles between the current NF unit 500 and a second NF unit; such that, the current NF unit 500 would become the b-NF instead of being the c-NF, and the other NF unit would switch from being the c-NF instead of being the b-NF. The switchover may be commenced by sending a switchover start message from the c-NF to the b-NF, to which the b-NF responds with a switchover ACK message; and this is followed by distribution of ARP messages by the b-NF, for example, an ARP message with a new I-VIP address is sent from the new c-NF to the ingress router, and an ARP message with a new E-VIP address is sent from the new c-NF to the egress router.

For demonstrative purposes, some portions of the discussion herein, as well as the drawings, may refer to ARP messages as a non-limiting example for implementation in an IPv4 network or system; however, the present invention may similarly be utilized in conjunction with other protocols for or mapping discovering the link layer address (e.g., the MAC address) that is associated with a particular Internet layer address, such as the Neighbor Discover Protocol (NDP) for IPv6 systems or networks, or other suitable discovery or mapping protocols.

NF unit 500 may further comprise one or more, or multiple, NF Processing Modules 530 able to perform (e.g., transparently, from the point-of-view of the sender entity and/or the recipient entity) one or more NF operations or processes; for example, Deep Packet Inspection (DPI) analysis, firewall operations, traffic filtering, traffic modification, discarding of packets, replacement of packets; enforcement of traffic quota; enforcement of upstream traffic rules; enforcement of downstream traffic rules; selective enforcement of traffic rules on traffic and/or on packets that underwent DPI analysis and based on (or, by taking into account) results of DPI analysis (e.g., a type of application or an identity of application that sends and/or receives the packets; a type of message that is transported via said packets, such as, an email message, a chat message, an Instant Messaging item, a multimedia or audio/video item, an encrypted item, or the like); enforcement of Internet Service Provider (ISP) rules; enforcement of Cellular Service Provider (CSP) rules; enforcement of other pre-defined rules (e.g., parental control rules; government rules; law enforcement rules; content filtering rules; organizational rules with regard to allowed or disallowed types of traffic); performance of cyber security operations (e.g., applying virus detection or virus protection; applying malware detection or malware protection; applying phishing detection or phishing protection; or the like); and/or other suitable network functions or traffic-handling functions.

In some embodiments, a system comprises: a first Network Function (NF) unit, connected to an ingress router and to an egress router; a second NF unit, connected to said ingress router and to said egress router; wherein the first NF unit is initially configured as a controlling NF; wherein the second NF unit is initially configured as a backup NF; wherein the first NF unit, operating as the controlling NF, periodically sends an ingress-bound keep-alive message to said ingress router, wherein said ingress-bound keep-alive message triggers said ingress router to send a first response message to the second NF unit operating as the backup NF; wherein the first NF unit, operating as the controlling NF, periodically sends an egress-bound keep-alive message to said egress router, wherein said egress-bound keep-alive message triggers said egress router to send a second response message to the second NF unit operating as the backup NF; wherein the second NF unit, operating as the backup NF, is to automatically trigger a switchover in which (i) said first NF unit is switched to being the backup NF and (ii) said second NF unit is switched to being the controlling NF, if the second NF unit did not receive, for at least a pre-defined time-period, at least one of: (I) the first response message from the ingress router, (I) the second response message from the egress router.

In some embodiments, in said switchover, (a) the second NF unit generates a new Ingress Virtual Internet Protocol (I-VIP) address and sends it to the ingress router via a first Address Resolution Protocol (ARP) message, and (b) the second NF unit generates a new Egress VIP (E-VIP) address and sends it to the egress router via a second ARP message.

In some embodiments, the first NF unit is a first Stateful NF unit; and the second NF unit is a second Stateful NF unit.

In some embodiments, the first NF unit is a first Stateful NF unit having multiple interfaces; and the second NF unit is a second Stateful NF unit having multiple interfaces.

In some embodiments, the first NF unit is a first hardware-based Stateful NF unit; and the second NF unit is a second hardware-based Stateful NF unit.

In some embodiments, the first NF unit is a first Stateful virtualized NF unit; and the second NF unit is a second Stateful virtualized NF unit.

In some embodiments, the first NF unit is a first Stateful containerized NF unit; and the second NF unit is a second Stateful containerized NF unit.

In some embodiments, the first NF unit is a first Stateful NF unit having multiple interfaces that comprise at least two of: Deep Packet Inspection (DPI) analysis, firewall operations, traffic filtering, traffic modification, discarding of packets, replacement of packets; and the second NF unit is a second Stateful NF unit having multiple interfaces that comprise at least two of: Deep Packet Inspection (DPI) analysis, firewall operations, traffic filtering, traffic modification, discarding of packets, replacement of packets.

In some embodiments, while the first NF unit operates as the controlling NF, (a) the second NF unit, operating as the backup NF, periodically sends an ingress-bound Acknowledgement message via the ingress router to the first NF which operates as the controlling NF; (b) the second NF unit, operating as the backup NF, periodically sends an egress-bound Acknowledgement message via the egress router to the first NF which operates as the controlling NF. In some embodiments, while the first NF unit operates as the controlling NF, (c) the first NF unit, operating as the controlling NF, checks whether a maintenance status of the second NF unit is better relative to a maintenance status of the first NF unit; and if the check result is positive, then the first NF unit automatically initiates a switchover in which (i) the first NF unit is switched to being the backup NF and (ii) the second NF unit is switched to being the controlling NF.

In some embodiments, the first NF unit, operating as the controlling NF, checks whether a maintenance status of the second NF unit is better relative to a maintenance status of the first NF unit, by performing at least one comparison of the following: comparison of availability level of the controlling NF and the backup NF, comparison of serviceability level of the controlling NF and the backup NF, comparison of Bit Error Ratio (BER) of the controlling NF and the backup NF, comparison of Packet Error Ratio (PER) of the controlling NF and the backup NF, comparison of Packet Loss Ratio, (PLR) of the controlling NF and the backup NF.

In some embodiments, a system comprises: a first Network Function (NF) unit, connected to an ingress router and to an egress router; a second NF unit, connected to said ingress router and to said egress router; wherein the first NF unit is initially configured as a controlling NF; wherein the second NF unit is initially configured as a backup NF; wherein the first NF unit, operating as the controlling NF, periodically sends an ingress-bound keep-alive message to said ingress router, wherein said ingress-bound keep-alive message triggers said ingress router to send a first response message to the second NF unit operating as the backup NF; wherein the first NF unit, operating as the controlling NF, periodically sends an egress-bound keep-alive message to said egress router, wherein said egress-bound keep-alive message triggers said egress router to send a second response message to the second NF unit operating as the backup NF; wherein, while the first NF unit operates as the controlling NF, (a) the second NF unit, operating as the backup NF, periodically sends an ingress-bound Acknowledgement message via the ingress router to the first NF which operates as the controlling NF; (b) the second NF unit, operating as the backup NF, periodically sends an egress-bound Acknowledgement message via the egress router to the first NF which operates as the controlling NF; (c) the first NF unit, operating as the controlling NF, checks whether a maintenance status of the second NF unit is better relative to a maintenance status of the first NF unit; and if the check result is positive, then the first NF unit automatically initiates a switchover in which (i) the first NF unit is switched to being the backup NF and (ii) the second NF unit is switched to being the controlling NF.

Some embodiments include a non-transitory storage medium having stored thereon instructions that, when executed by a machine, cause the machine to perform a method as described above. Some embodiments include an apparatus comprising: a hardware processor to execute program code, and a memory unit store program code; wherein the hardware processor is configured to execute program code which, when executed, causes said apparatus to perform a method as describe above.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments of the present invention include a method of providing hot reservation for in-line deployed network functions in a communication network; wherein the communication network comprises at least: (i) a first Network Function (NF) unit, connected to an ingress router and to an egress router; and (ii) a second NF unit, connected to said ingress router and to said egress router. The method comprises: initially configuring the first NF unit as a controlling NF; initially configuring the second NF unit as a backup NF; at the first NF unit, operating as the controlling NF, periodically sending an ingress-bound keep-alive message to said ingress router, wherein said ingress-bound keep-alive message triggers said ingress router to send a first response message to the second NF unit operating as the backup NF; at the first NF unit, operating as the controlling NF, periodically sending an egress-bound keep-alive message to said egress router, wherein said egress-bound keep-alive message triggers said egress router to send a second response message to the second NF unit operating as the backup NF; at the second NF unit, operating as the backup NF, automatically triggering a switchover in which (i) said first NF unit is switched to being the backup NF and (ii) said second NF unit is switched to being the controlling NF, if the second NF unit did not receive, for at least a pre-defined time-period, at least one of: (I) the first response message from the ingress router, (II) the second response message from the egress router.

In some embodiments, the method comprises, in said switchover: (a) at the second NF unit, generating a new Ingress Virtual Internet Protocol (I-VIP) address and sending it to the ingress router via a first Address Resolution Protocol (ARP) message; (b) at the second NF unit, generating a new Egress VIP (E-VIP) address and sending it to the egress router via a second ARP message.

In some embodiments, (a) the first NF unit is a first Stateful NF unit having multiple interfaces that comprise at least two of: Deep Packet Inspection (DPI) analysis, firewall operations, traffic filtering, traffic modification, discarding of packets, replacement of packets; and (b) the second NF unit is a second Stateful NF unit having multiple interfaces that comprise at least two of: Deep Packet Inspection (DPI) analysis, firewall operations, traffic filtering, traffic modification, discarding of packets, replacement of packets.

In some embodiments, the first NF unit is a first Stateful NF unit; wherein the second NF unit is a second Stateful NF unit.

Some embodiments may include a system comprising: a first Network Function (NF) unit, connected to an ingress router and to an egress router; a second NF unit, connected to said ingress router and to said egress router; wherein the first NF unit is initially configured as a controlling NF; wherein the second NF unit is initially configured as a backup NF; wherein the first NF unit, operating as the controlling NF, periodically sends an ingress-bound keep-alive message to said ingress router, wherein said ingress-bound keep-alive message triggers said ingress router to send a first response message to the second NF unit operating as the backup NF; wherein the first NF unit, operating as the controlling NF, periodically sends an egress-bound keep-alive message to said egress router, wherein said egress-bound keep-alive message triggers said egress router to send a second response message to the second NF unit operating as the backup NF. While the first NF unit operates as the controlling NF: (a) the second NF unit, operating as the backup NF, periodically sends an ingress-bound Acknowledgement message via the ingress router to the first NF which operates as the controlling NF; (b) the second NF unit, operating as the backup NF, periodically sends an egress-bound Acknowledgement message via the egress router to the first NF which operates as the controlling NF; (c) the first NF unit, operating as the controlling NF, checks whether (I) a value of a Quality-of-Service parameter associated with the second NF unit, is greater than (II) a value of Quality-of-Service parameter associated with the first NF unit; and if the check result is positive, then the first NF unit automatically initiates a switchover in which (i) the first NF unit is switched to being the backup NF and (ii) the second NF unit is switched to being the controlling NF.

In some embodiments, the system may comprise one or more units or components or modules, to determine or measure or estimate a Quality-of-Service parameter or value or indicator, that is associated with the operation of the First NF and/or that is associated with the Second NF, and/or that is associated with the operation that is currently the Controlling NF, and/or that is associated with the operation of the Backup NF. For example, such unit(s) or component(s) may measure, or may estimate, or may take into account, one or more performance parameters or operational parameters of such NF; for example, a Bit Error Rate (BER), a Packet Error Rate (PER), a Packet Loss Ratio (PLR), other type(s) of parameters that represent or that indicate (directly or indirectly) the Quality-of-Service provided by the NF (e.g., packet loss; bit rate; throughput; goodput; transmission delay; latency; packet delay variation; out-of-order delivery; availability; past outages; frequency or timing of outages; outage probability; serviceability level, or level of serviceability, supportability level or score, reliability level or score, usability level of score, quality of audio and/or video (e.g., if such media items or streams are transported); jitter; jittery service; grade of service; or the like); and/or other parameters or indicators. In some embodiments, the values of such parameters that are measured or sensed or estimated with regard to the First NF (or with regard to the Controlling NF), are compared to the corresponding values that are measured or sensed or estimated with regard to the Second NF (or with regard to the Backup NF). In some embodiments, the values of such parameters that are measured or sensed or estimated with regard to the First NF (or with regard to the Controlling NF), are compared to pre-defined threshold values or threshold ranges-of-values. In some embodiments, the values of such parameters that are measured or sensed or estimated with regard to the Second NF (or with regard to the Backup NF), are compared to pre-defined threshold values or threshold ranges-of-values. In some embodiments, the values of such parameters may be measured or sensed or estimated by the First NF, and/or by the Second NF, and/or by the Controlling NF, and/or by the Backup NF, or by one or more other components or units in the system (e.g., a unit or component that is external to the First NF and the Second NF and periodically checks or monitors their availability or their QoS).

In some embodiments, the first NF unit, operating as the controlling NF, checks whether (I) a value of a Quality-of-Service parameter associated with the second NF unit, is greater than (II) a value of Quality-of-Service parameter associated with the first NF unit, by performing at least a comparison between (i) a first value indicating a Bit Error Ratio (BER) level that is associated with the controlling NF, and (ii) a second value indicating a Bit Error Ratio (BER) level that is associated with the backup NF.

In some embodiments, the first NF unit, operating as the controlling NF, checks whether (I) a value of a Quality-of-Service parameter associated with the second NF unit, is greater than (II) a value of Quality-of-Service parameter associated with the first NF unit, by performing at least a comparison between (i) a first value indicating a Packet Error Ratio (PER) level that is associated with the controlling NF, and (ii) a second value indicating a Packet Error Ratio (PER) level that is associated with the backup NF.

In some embodiments, the first NF unit, operating as the controlling NF, checks whether (I) a value of a Quality-of-Service parameter associated with the second NF unit, is greater than (II) a value of Quality-of-Service parameter associated with the first NF unit, by performing at least a comparison between (i) a first value indicating a Packet Loss Ratio (PLR) level that is associated with the controlling NF, and (ii) a second value indicating a Packet Loss Ratio (PLR) level that is associated with the backup NF.

In some embodiments, the first NF unit, operating as the controlling NF, checks whether (I) a value of a Quality-of-Service parameter associated with the second NF unit, is greater than (II) a value of Quality-of-Service parameter associated with the first NF unit, by performing at least a comparison between (i) a first value indicating an availability level of the controlling NF, and (ii) a second value indicating an availability level of the backup NF.

In some embodiments, the first NF unit, operating as the controlling NF, checks whether (I) a value of a Quality-of-Service parameter associated with the second NF unit, is greater than (II) a value of Quality-of-Service parameter associated with the first NF unit, by performing at least a comparison between (i) a first value indicating a serviceability level of the controlling NF, and (ii) a second value indicating a serviceability level of the backup NF.

In some embodiments, (a) the first NF unit is a first Stateful NF unit having multiple interfaces that comprise at least two of: Deep Packet Inspection (DPI) analysis, firewall operations, traffic filtering, traffic modification, discarding of packets, replacement of packets; (b) wherein the second NF unit is a second Stateful NF unit having multiple interfaces that comprise at least two of: Deep Packet Inspection (DPI) analysis, firewall operations, traffic filtering, traffic modification, discarding of packets, replacement of packets.

In some embodiments, the first NF unit is a first Stateful NF unit; wherein the second NF unit is a second Stateful NF unit.

In some embodiments, the first NF unit is a first Stateful NF unit having multiple interfaces; wherein the second NF unit is a second Stateful NF unit having multiple interfaces.

In some embodiments, the first NF unit is a first hardware-based Stateful NF unit; wherein the second NF unit is a second hardware-based Stateful NF unit.

In some embodiments, the first NF unit is a first Stateful virtualized NF unit; wherein the second NF unit is a second Stateful virtualized NF unit.

In some embodiments, the first NF unit is a first Stateful containerized NF unit; wherein the second NF unit is a second Stateful containerized NF unit.

Some embodiments include a method of providing hot reservation for in-line deployed network functions in a communication network; wherein the communication network comprises at least: (i) a first Network Function (NF) unit, connected to an ingress router and to an egress router; and (ii) a second NF unit, connected to said ingress router and to said egress router. The method comprises: initially configuring the first NF unit as a controlling NF; initially configuring the second NF unit as a backup NF; at the first NF unit, operating as the controlling NF, periodically sending an ingress-bound keep-alive message to said ingress router, wherein said ingress-bound keep-alive message triggers said ingress router to send a first response message to the second NF unit operating as the backup NF; at the first NF unit, operating as the controlling NF, periodically sending an egress-bound keep-alive message to said egress router, wherein said egress-bound keep-alive message triggers said egress router to send a second response message to the second NF unit operating as the backup NF. The method comprises, while the first NF unit operates as the controlling NF: (a) at the second NF unit, operating as the backup NF, periodically sending an ingress-bound Acknowledgement message via the ingress router to the first NF which operates as the controlling NF; (b) at the second NF unit, operating as the backup NF, periodically sending an egress-bound Acknowledgement message via the egress router to the first NF which operates as the controlling NF; (c) at the first NF unit, operating as the controlling NF, checking whether (I) a value of a Quality-of-Service parameter associated with the second NF unit, is greater than (II) a value of Quality-of-Service parameter associated with the first NF unit; and if the check result is positive, then: at the first NF unit, automatically initiating a switchover in which (i) the first NF unit is switched to being the backup NF and (ii) the second NF unit is switched to being the controlling NF.

In some embodiments, the method comprises, in said switchover: (a) at the second NF unit, generating a new Ingress Virtual Internet Protocol (I-VIP) address and sending it to the ingress router via a first Address Resolution Protocol (ARP) message; (b) at the second NF unit, generating a new Egress VIP (E-VIP) address and sending it to the egress router via a second ARP message.

In some embodiments, (a) the first NF unit is a first Stateful NF unit having multiple interfaces that comprise at least two of: Deep Packet Inspection (DPI) analysis, firewall operations, traffic filtering, traffic modification, discarding of packets, replacement of packets; and (b) the second NF unit is a second Stateful NF unit having multiple interfaces that comprise at least two of: Deep Packet Inspection (DPI) analysis, firewall operations, traffic filtering, traffic modification, discarding of packets, replacement of packets.

In some embodiments, the first NF unit is a first Stateful NF unit; wherein the second NF unit is a second Stateful NF unit.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A method of providing hot reservation for in-line deployed network functions in a communication network,
wherein the communication network comprises at least: (i) a first Network Function (NF) unit, connected to an ingress router and to an egress router; and (ii) a second NF unit, connected to said ingress router and to said egress router;
wherein the method comprises:
initially configuring the first NF unit as a controlling NF;
initially configuring the second NF unit as a backup NF;
at the first NF unit, operating as the controlling NF, periodically sending an ingress-bound keep-alive message to said ingress router, wherein said ingress-bound keep-alive message triggers said ingress router to send a first response message to the second NF unit operating as the backup NF;
at the first NF unit, operating as the controlling NF, periodically sending an egress-bound keep-alive message to said egress router, wherein said egress-bound keep-alive message triggers said egress router to send a second response message to the second NF unit operating as the backup NF;
at the second NF unit, operating as the backup NF, automatically triggering a switchover in which (i) said first NF unit is switched to being the backup NF and (ii) said second NF unit is switched to being the controlling NF, if the second NF unit did not receive, for at least a pre-defined time-period, at least one of: (I) the first response message from the ingress router, (II) the second response message from the egress router.

2. The method of claim 1,
wherein the method comprises, in said switchover,
(a) at the second NF unit, generating a new Ingress Virtual Internet Protocol (I-VIP) address and sending it to the ingress router via a first Address Resolution Protocol (ARP) message;
(b) at the second NF unit, generating a new Egress VIP (E-VIP) address and sending it to the egress router via a second ARP message.

3. The method of claim 1,
(a) wherein the first NF unit is a first Stateful NF unit having multiple interfaces that comprise at least two of:
Deep Packet Inspection (DPI) analysis,
firewall operations,
traffic filtering,
traffic modification,
discarding of packets,
replacement of packets;
(b) wherein the second NF unit is a second Stateful NF unit having multiple interfaces that comprise at least two of:
Deep Packet Inspection (DPI) analysis,
firewall operations,
traffic filtering,
traffic modification,
discarding of packets,
replacement of packets.

4. The method of claim 1,
wherein the first NF unit is a first Stateful NF unit;
wherein the second NF unit is a second Stateful NF unit.

5. A system comprising:
a first Network Function (NF) unit, connected to an ingress router and to an egress router;
a second NF unit, connected to said ingress router and to said egress router;
wherein the first NF unit is initially configured as a controlling NF;
wherein the second NF unit is initially configured as a backup NF;
wherein the first NF unit, operating as the controlling NF, periodically sends an ingress-bound keep-alive message to said ingress router, wherein said ingress-bound keep-alive message triggers said ingress router to send a first response message to the second NF unit operating as the backup NF;
wherein the first NF unit, operating as the controlling NF, periodically sends an egress-bound keep-alive message to said egress router, wherein said egress-bound keep-alive message triggers said egress router to send a second response message to the second NF unit operating as the backup NF;
wherein, while the first NF unit operates as the controlling NF,
(a) the second NF unit, operating as the backup NF, periodically sends an ingress-bound Acknowledgement message via the ingress router to the first NF which operates as the controlling NF;
(b) the second NF unit, operating as the backup NF, periodically sends an egress-bound Acknowledgement message via the egress router to the first NF which operates as the controlling NF;
(c) the first NF unit, operating as the controlling NF, checks whether (I) a value of a Quality-of-Service parameter associated with the second NF unit, is greater than (II) a value of Quality-of-Service parameter associated with the first NF unit; and if the check result is positive, then the first NF unit automatically initiates a switchover in which (i) the first NF unit is switched to being the backup NF and (ii) the second NF unit is switched to being the controlling NF.

6. The system of claim 5,
wherein the first NF unit, operating as the controlling NF, checks whether (I) a value of a Quality-of-Service parameter associated with the second NF unit, is greater than (II) a value of Quality-of-Service parameter associated with the first NF unit, by performing at least a comparison between (i) a first value indicating a Bit Error Ratio (BER) level that is associated with the controlling NF, and (ii) a second value indicating a Bit Error Ratio (BER) level that is associated with the backup NF.

7. The system of claim 5,
wherein the first NF unit, operating as the controlling NF, checks whether (I) a value of a Quality-of-Service parameter associated with the second NF unit, is greater than (II) a value of Quality-of-Service parameter associated with the first NF unit, by performing at least a comparison between (i) a first value indicating a Packet Error Ratio (PER) level that is associated with the controlling NF, and (ii) a second value indicating a Packet Error Ratio (PER) level that is associated with the backup NF.

8. The system of claim 5,
wherein the first NF unit, operating as the controlling NF, checks whether (I) a value of a Quality-of-Service parameter associated with the second NF unit, is greater than (II) a value of Quality-of-Service parameter associated with the first NF unit, by performing at least a comparison between (i) a first value indicating a Packet Loss Ratio (PLR) level that is associated with the controlling NF, and (ii) a second value indicating a Packet Loss Ratio (PLR) level that is associated with the backup NF.

9. The system of claim 5,
wherein the first NF unit, operating as the controlling NF, checks whether (I) a value of a Quality-of-Service parameter associated with the second NF unit, is greater than (II) a value of Quality-of-Service parameter associated with the first NF unit, by performing at least a comparison between (i) a first value indicating an availability level of the controlling NF, and (ii) a second value indicating an availability level of the backup NF.

10. The system of claim 5,
wherein the first NF unit, operating as the controlling NF, checks whether (I) a value of a Quality-of-Service parameter associated with the second NF unit, is greater than (II) a value of Quality-of-Service parameter associated with the first NF unit, by performing at least a comparison between (i) a first value indicating a serviceability level of the controlling NF, and (ii) a second value indicating a serviceability level of the backup NF.

11. The system of claim 5,
(a) wherein the first NF unit is a first Stateful NF unit having multiple interfaces that comprise at least two of:
Deep Packet Inspection (DPI) analysis,
firewall operations,
traffic filtering,
traffic modification,
discarding of packets,
replacement of packets;
(b) wherein the second NF unit is a second Stateful NF unit having multiple interfaces that comprise at least two of:
Deep Packet Inspection (DPI) analysis,
firewall operations,
traffic filtering,
traffic modification,
discarding of packets,
replacement of packets.

12. The system of claim 5,
wherein the first NF unit is a first Stateful NF unit;
wherein the second NF unit is a second Stateful NF unit.

13. The system of claim 5,
wherein the first NF unit is a first Stateful NF unit having multiple interfaces;
wherein the second NF unit is a second Stateful NF unit having multiple interfaces.

14. The system of claim 5,
wherein the first NF unit is a first hardware-based Stateful NF unit;
wherein the second NF unit is a second hardware-based Stateful NF unit.

15. The system of claim 5,
wherein the first NF unit is a first Stateful virtualized NF unit;
wherein the second NF unit is a second Stateful virtualized NF unit.

16. The system of claim 5,
wherein the first NF unit is a first Stateful containerized NF unit;
wherein the second NF unit is a second Stateful containerized NF unit.

17. A method of providing hot reservation for in-line deployed network functions in a communication network,
wherein the communication network comprises at least:
(i) a first Network Function (NF) unit, connected to an ingress router and to an egress router; and (ii) a second NF unit, connected to said ingress router and to said egress router;
wherein the method comprises:
initially configuring the first NF unit as a controlling NF;
initially configuring the second NF unit as a backup NF;
at the first NF unit, operating as the controlling NF, periodically sending an ingress-bound keep-alive message to said ingress router, wherein said ingress-bound keep-alive message triggers said ingress router to send a first response message to the second NF unit operating as the backup NF;
at the first NF unit, operating as the controlling NF, periodically sending an egress-bound keep-alive message to said egress router, wherein said egress-bound keep-alive message triggers said egress router to send a second response message to the second NF unit operating as the backup NF;
wherein, the method comprises, while the first NF unit operates as the controlling NF,
(a) at the second NF unit, operating as the backup NF, periodically sending an ingress-bound Acknowledgement message via the ingress router to the first NF which operates as the controlling NF;
(b) at the second NF unit, operating as the backup NF, periodically sending an egress-bound Acknowledgement message via the egress router to the first NF which operates as the controlling NF;
(c) at the first NF unit, operating as the controlling NF, checking whether (I) a value of a Quality-of-Service parameter associated with the second NF unit, is greater than (II) a value of Quality-of-Service parameter associated with the first NF unit; and if the check result is positive, then: at the first NF unit, automatically initiating a switchover in which (i) the first NF unit is switched to being the backup NF and (ii) the second NF unit is switched to being the controlling NF.

18. The method of claim 17,
wherein the method comprises, in said switchover,
(a) at the second NF unit, generating a new Ingress Virtual Internet Protocol (I-VIP) address and sending it to the ingress router via a first Address Resolution Protocol (ARP) message;
(b) at the second NF unit, generating a new Egress VIP (E-VIP) address and sending it to the egress router via a second ARP message.

19. The method of claim 17,
(a) wherein the first NF unit is a first Stateful NF unit having multiple interfaces that comprise at least two of:
Deep Packet Inspection (DPI) analysis,
firewall operations,
traffic filtering,
traffic modification,
discarding of packets,
replacement of packets;
(b) wherein the second NF unit is a second Stateful NF unit having multiple interfaces that comprise at least two of:
Deep Packet Inspection (DPI) analysis,
firewall operations,
traffic filtering,
traffic modification,
discarding of packets,
replacement of packets.

20. The method of claim 17,
wherein the first NF unit is a first Stateful NF unit;
wherein the second NF unit is a second Stateful NF unit.

* * * * *